US006214103B1

(12) United States Patent
Kitagawa

(10) Patent No.: US 6,214,103 B1
(45) Date of Patent: *Apr. 10, 2001

(54) ASPHALT PAVING MIX FOR PAVING AT AMBIENT TEMPERATURES AND A PROCESS FOR MAKING THE SAME

(75) Inventor: Terutaka Kitagawa, Kyoto (JP)

(73) Assignee: Hikarigiken Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,050

(22) Filed: Apr. 16, 1999

(30) Foreign Application Priority Data

Apr. 28, 1998 (JP) .................................. 10-156604
Dec. 15, 1998 (JP) .................................. 10-356412

(51) Int. Cl.$^7$ .................................. C09D 195/00
(52) U.S. Cl. ........................ 106/284.01; 106/280
(58) Field of Search .................. 106/280, 284.01

(56) References Cited

U.S. PATENT DOCUMENTS

| 4,000,000 | * | 12/1976 | Mendenhall | 106/280 |
| 5,221,338 | * | 6/1993 | Gaudio et al. | 106/282 |
| 5,234,494 | * | 8/1993 | Sawatzky et al. | 106/284.4 |
| 5,755,865 | * | 5/1998 | Lukens | 106/279 |
| 6,117,227 | * | 9/2000 | Kitagawa | 106/284.01 |

FOREIGN PATENT DOCUMENTS 54-21419  2/1979  (JP) .
2-91303   3/1990  (JP) .

* cited by examiner

*Primary Examiner*—David Brunsman
(74) *Attorney, Agent, or Firm*—Christensen O'Connor Johnson Kindness PLLC

(57) ABSTRACT

An improved asphalt mix and a process for making the same are proposed. The asphalt mix includes new aggregate and new asphalt, which are mixed together at a high temperature so that the asphalt covers the surfaces of the new aggregate. The mix further includes recycled aggregate obtained from crushing recycled asphalt concrete at an ambient temperature to such an extent that each aggregate grain will retain some asphalt on its surface. The recycled aggregate at an ambient temperature is mixed with the new aggregate covered with the new asphalt to form an asphalt composition, and to lower the overall asphalt composition temperature to, at the maximum, approximately 100° C. To the asphalt composition thus formed, additive oil is mixed to complete the asphalt mix. The additive oil has a low vapor pressure so as to be practically nonvolatile and has mutual solubility with asphalt. Thus, when the asphalt composition is mixed with the additive oil, the asphalt on the surfaces of both new and recycled aggregate swells by absorbing the oil. When the asphalt mix is cooled to ambient temperatures, because the asphalt remains swollen at these temperatures, the asphalt mix does not congeal together and, thus, may be stored intact for a long time. However, when the mix is firmly compacted at ambient temperatures, the swollen asphalt on the aggregate surfaces amalgamates together to form a solid block or a pavement instantly after the compaction.

38 Claims, No Drawings

ASPHALT PAVING MIX FOR PAVING AT AMBIENT TEMPERATURES AND A PROCESS FOR MAKING THE SAME

FIELD OF THE INVENTION

The present invention relates to an asphalt paving mix suitable for use at ambient temperatures and, more specifically, to an asphalt paving mix formed of new aggregate, new asphalt, recycled asphalt concrete, and practically nonvolatile additive oil.

BACKGROUND OF THE INVENTION

Some asphalt mixes have been proposed in the past, which include new aggregate and new asphalt, and are suitable for paving at ambient temperatures. Typically, the new aggregate is heated, and heated new asphalt is added to produce a heated asphalt composition. Alternatively, a mixture of new aggregate and recycled aggregate, which is obtained from crushing recycled asphalt concrete, has been used, and heated asphalt is added to produce a heated asphalt composition. To these heated asphalt compositions, a suitable amount of volatile oil, such as heavy oil, light oil, or kerosene, is added to soften the asphalt, so that the resulting asphalt mix will not congeal and solidify immediately after returning to an ambient temperature.

These asphalt mixes are environmentally disadvantageous in that the volatile oil included in these mixes starts to evaporate and is emitted to ambient air immediately after the mixes are applied to form a pavement. Further, these mixes cannot harden immediately after their application at a paving site and, rather, take a considerable amount of time before achieving a desired hardness. The amount of volatile oil to be added may be reduced so as to achieve a sufficiently hard pavement surface immediately after paving. This, however, will make it impossible to store the asphalt mix for a long period since a reduced amount of volatile oil will almost entirely evaporate while in storage, thereby causing the asphalt mix to solidify.

Some other asphalt mixes have been proposed in the past, which include a special additive (chemical substance) to cause a polycondensation reaction, so as to increase the hardness of the resulting asphalt pavement after it is solidified. Production of such special additives, however, is extremely cumbersome and expensive, and the strength of the resulting asphalt pavement cannot be expected to improve substantially.

To overcome these disadvantages described above, some asphalt mixes using only recycled aggregate obtained from crushing recycled asphalt concrete have been proposed, which are also suited for application at ambient temperatures. These mixes include practically nonvolatile additive oil, such as petroleum hydrocarbons. Though this type of asphalt mix overcomes some disadvantages associated with other mixes described above, it still suffers some disadvantages.

Specifically, since recycled asphalt concrete used in this type of mix is obtained by peeling off a roadbed surface, the quality of recycled asphalt concrete tends to vary and, often, is poor. When poor quality recycled asphalt concrete is used to form an asphalt mix, the mix may not be suited to form a sufficiently strong and stable pavement. Further, recycled asphalt concrete is often excessively oxidized and becomes as stiff as a cement pavement material and, thus, may lack elasticity required to form a suitable asphalt pavement material.

A need exists for an improved asphalt mix suitable for forming and repairing a pavement at an ambient temperature, which can be stored for a long time, and is capable of achieving sufficient strength and stability immediately after its application at a paving site. Such asphalt mix preferably should also be environmentally friendly. Further, the quality of such asphalt mix preferably should not depend solely on the quality of recycled asphalt concrete, which often tends to be poor.

SUMMARY OF THE INVENTION

The present invention provides an improved asphalt mix and a process of making the same, which overcome many if not all of the disadvantages associated with the prior art asphalt mixes as described above. The asphalt mix includes new aggregate and new asphalt, which are mixed together at a high temperature so that the asphalt covers the surfaces of the new aggregate. The mix further includes recycled aggregate obtained from crushing recycled asphalt concrete at an ambient temperature to such an extent that each aggregate grain of the recycled asphalt concrete will retain some asphalt on its surface. The recycled aggregate is mixed with the new aggregate covered with the new asphalt to form an asphalt composition, lowering the overall asphalt composition temperature to, at the maximum, approximately 100° C. To the asphalt composition thus formed, additive oil is mixed to complete the asphalt mix. The additive oil has a low vapor pressure so as to be practically nonvolatile. The oil has mutual solubility with asphalt. Thus, when the asphalt composition is mixed with the additive oil, the asphalt on the surfaces of both new and recycled aggregate swells by absorbing the oil Even after the asphalt mix is cooled to ambient temperatures, because the asphalt or the aggregate remains swollen at these temperatures, the asphalt mix does not congeal together and, thus, may be stored intact for a long time. However, when the mix is firmly compacted at ambient temperatures, the swollen asphalt on the aggregate surfaces amalgamates together to form a solid block or a pavement instantly after the compaction. As noted above, because the additive oil is practically nonvolatile, very little oil is emitted to ambient air and, thus, the asphalt mix of the present invention is environmentally friendly.

DETAILED DESCRIPTION OF THE PREFERRED EMBODIMENT

The present invention provides an improved asphalt mix. The mi includes new aggregate including, for example, sand and crushed stones, and new asphalt. The mix also includes recycled aggregate obtained from crushing recycled asphalt concrete to such an extent that each aggregate grain of recycled asphalt concrete will retain recycled asphalt on its surface. The new aggregate and the new asphalt are heated (for example, 150°–160° C.) so that when the two are mixed together, the heated asphalt will cover the surfaces of the new aggregate.

To the new aggregate covered with the new asphalt, the recycled aggregate at an ambient temperature is mixed to form an asphalt composition, and to lower the overall asphalt composition temperature to, at the maximum, approximately 100° C. Into the asphalt composition thus formed, additive oil is mixed to complete the mix. The additive oil has a low vapor pressure, and preferably has a flashpoint higher than approximately 200° C. so as to be practically nonvolatile. The oil has mutual solubility with asphalt. Thus, when the additive oil and the asphalt composition are mixed together, the asphalt (both new and recycled) on the surfaces of the new and recycled aggregate swells by absorbing the oil. When the asphalt mix thus formed is cooled and later firmly compacted at ambient temperatures, the swollen asphalt on the aggregate surfaces amalgamates together to instantly form a stable paving surface.

Recycled aggregate is obtained from crushing recycled asphalt concrete at ambient temperatures, wherein each aggregate grain is sized sufficiently so as to retain some asphalt on its surface. Because the asphalt on these recycled aggregate is typically aged by weathering, it is typically stiffer than virgin asphalt. When a prescribed amount of the oil is added, the stiffened asphalt on recycled aggregate tends to swell easily without becoming softened excessively. It has been found that recycled aggregate grains sized to pass through a 13 mm sieve, which is a standard grain size as prescribed by the Japanese Ministry of Construction, work well in the present invention. It should be noted, though, that those skilled in the art may readily determine other recycled grain sizes that may be suitably used in accordance with the present invention. For example, to form a base asphalt concrete, recycled aggregate grains that pass through a 20 mm sieve may be preferable.

New aggregate is preheated so that, when the new aggregate and heated new asphalt (both typically at a temperature between 150° C. and 160° C.), are thoroughly mixed together (typically for approximately one minute, for example), the heated new asphalt covers the surfaces of the new aggregate. When the new aggregate thus covered with the new asphalt is mixed with recycled aggregate that is at an ambient temperature (typically for approximately 15 seconds, for example), the temperature of the resulting asphalt composition will be lowered to a temperature, at the maximum, approximately 100° C. The temperature of the resulting asphalt composition is preferably closer to an ambient temperature. When a prescribed amount of additive oil is mixed with the asphalt composition thus formed, the asphalt on the aggregate surfaces will be swollen.

Even after the asphalt mix cools down to an ambient temperature, the asphalt on the aggregate surfaces will remain swollen, with the additive oil absorbed therein, as compared with the original state of asphalt. When the asphalt mix comprising the aggregate covered with the swollen asphalt is firmly compacted at an ambient temperature, an adequately hard and stable block or paving surface is formed instantly.

The additive oil to be mixed with the aggregate has a mutual solubility with asphalt, so that asphalt covering the surfaces of the aggregate can be swollen easily. Further, the additive oil is practically nonvolatile so that the swollen state of the asphalt can be maintained for a long period, without causing the asphalt on the aggregate surfaces to congeal together.

The swelling of the asphalt on the aggregate surfaces should be sufficient to allow the swollen asphalt on each aggregate surface to intermingle with, and adhere to, the swollen asphalt on adjacent aggregate surfaces when the asphalt mix is firmly compacted at an ambient temperature. Thus, when the asphalt mix comprising the asphalt swollen with additive oil is applied on a roadbed and is compacted by, for example, rolling or vibration at ambient temperatures, the aggregate grains compact themselves together, eliminating any space therebetween and further deforming and bonding together the swollen asphalt on the aggregate surfaces. Thus, the swollen asphalt functions as a binder to bond the aggregate firmly together, to create a paving surface having a sufficient hardness immediately after the completion of paving.

Accordingly, even if the recycled asphalt concrete used to obtain the recycled aggregate is of poor quality, the overall quality of the asphalt mix of the present invention may be easily improved by mixing a suitable amount of the new aggregate and new asphalt thereto. Further, even if the recycled asphalt concrete lacks sufficient elasticity to be suitable for forming an asphalt pavement, as long as the recycled aggregate is mixed with an appropriate amount of new aggregate and new asphalt, the resulting asphalt mix will have sufficient elasticity required for an asphalt paving material.

The additive oils suitable for use in the present invention include petroleum hydrocarbons, animal/plant oils and fats, synthetic hydrocarbons, and synthetic esters. However, animal/plant oils and fats are subject to various adverse reactions and also tend to deteriorate easily and, thus, may not be preferable. Synthetic hydrocarbons and esters are both relatively expensive and may not be preferable either. Thus, preferably petroleum hydrocarbons, further preferably heavy hydrocarbon oils having a flashpoint higher than approximately 200° C., are used as additive oils.

To achieve uniform mixing of the aggregate and the additive oil, it may be preferable to use additive oil having a lower viscosity. On the other hand, to achieve a strong paving surface, it may be preferable to use additive oil having a higher viscosity. The viscosity of the additive oil also affects the degree of asphalt swelling. Considering all these factors, it has been found that additive oil having a kinematic viscosity of between approximately 20 and 200 (cSt. at 40° C.) is preferable. It has also been found that the kinematic viscosity in the range between approximately 40 and 120 (cSt. at 40° C.) appears to be optimum. In general, oil having a lower kinematic viscosity is preferred in the winter, and oil having a higher kinematic viscosity is preferred during the summer.

The amount of additive oil to be added is determined based on the total amount of asphalt adhered to the surfaces of the new and recycled aggregate. When too much additive oil is used, relative to the total amount of asphalt on the aggregate surfaces, the asphalt will swell and soften excessively, thereby reducing the mutual cohesiveness between aggregate and, further, weakening the strength of the resulting pavement. If too little additive oil is used, the asphalt will not swell sufficiently, thereby also preventing adequate bonding between the aggregate even after firm compaction. Accordingly, it has been found that a preferable ratio of the additive oil to the asphalt retained on the aggregate is between approximately 0.15 and 0.50 by weight, further preferably between approximately 0.20 and 0.35.

The composition ratio between the new aggregate and the recycled aggregate is determined based on the desired quality of the resulting asphalt mix, and also based on availability of recycled asphalt concrete, from which recycled aggregate is obtained. Also, if the recycled aggregate is of rather high quality (including approximately 5% by weight of asphalt), more recycled aggregate may be added to the new aggregate. If, on the other hand, the recycled aggregate is of poor quality, a reduced amount of recycled aggregate should be mixed with the new aggregate. Considering all these factors, it has been found that the ratio of new aggregate within the total asphalt mix is preferably between approximately 20% and 70% by weight, and further preferably between approximately 30% and 50% by weight.

As the new aggregate, a mixture of coarse aggregate (crushed stones) and fine aggregate (sand), or fine or coarse aggregate alone, may be used. The new aggregate is sized similarly to the recycled aggregate as described above. In mixing old and new aggregate together, as the ratio of new aggregate increases, the amount of new asphalt to be added should also increase, since more new asphalt will be needed to cover the surfaces of the new aggregate at least partially. The penetration of the new asphalt should be adjusted, also, according to the ratio of new aggregate within the total aggregate. In the present description, penetration is defined according to the convention, as the depth that a needle having a prescribed configuration may plunge into when a vertical load of 100 g is applied for 5 seconds at 25° C. When more new aggregate is used, the penetration of new asphalt to be added should be lessened, and vice versa. It has been determined that, in general, the new asphalt (petroleum asphalt) to be used preferably has a penetration of between approximately 20 and 120 (1/10 mm at 25° C.). It should be noted that those skilled in the art may readily determine a preferred level of penetration, based in part on geographical and temperature considerations.

The performance or quality of the asphalt mix of the present invention depends on the total amount of asphalt included within the mix. If there is too little asphalt, the mix will produce an asphalt concrete with insufficient strength, which easily crumbles or cracks. On the other hand, if too much asphalt is included in the mix, the resulting asphalt concrete will not have sufficient strength due to excessive plasticity.

Recycled aggregate obtained from crushing recycled asphalt concrete retains some asphalt adhered to the surfaces. Thus, the total asphalt content of the asphalt mix includes both the recycled asphalt retained on recycled aggregate surfaces and the new asphalt added to the mix Accordingly, the amount of new asphalt to be added is determined based, in part, on the amount of recycled asphalt retained on recycled aggregate used and, ultimately, on the performance quality of the asphalt mix to be obtained. Specifically, it has been found that the amount of new asphalt is preferably between 4.5% and 6.5% by weight with respect to the new aggregate, so that the total asphalt amount including the asphalt retained on the recycled aggregate Will be preferably between 4% and 6% by weight of the final asphalt mix.

The asphalt mix of the present invention may optionally include calcium carbonate ($CaCO_3$) powder as a filler. Calcium carbonate fills in the space between aggregate and, thus, is believed to increase the strength of resulting asphalt concrete after compaction. It is also believed to help prevent solidification of asphalt mix during storage. The amount of calcium carbonate powder to be added is preferably between approximately 3% and 10% by weight, and further preferably between approximately 5% and 7% by weight, of the total weight of the asphalt mix.

The present invention also provides a process of forming the asphalt mix of the present invention as described above. Specifically, the process provides heated new aggregate and heated new asphalt. The process mixes the two so that the heated asphalt will cover the surfaces of the new aggregate. The process further provides recycled aggregate obtained from crushing recycled asphalt concrete at an ambient temperature to such an extent that each recycled aggregate grain will retain at least some asphalt on its surface. The recycled aggregate is mixed with the heated new aggregate covered with the heated new asphalt to form an asphalt composition, lowering the overall asphalt composition temperature to, at the maximum, approximately 100° C., preferably as close as possible to an ambient temperature. The process further mixes a prescribed amount of additive oil to the asphalt composition, wherein the oil has a low vapor pressure so as to be practically nonvolatile. The additive oil also has mutual solubility with asphalt. The process finally mixes the additive oil with the asphalt composition so as to swell the asphalt on the aggregate surfaces with the oil, to allow the asphalt to amalgamate together when firmly compacted at an ambient temperature to form a pavement. Optionally, calcium carbonate powder may be further added as a filler after the oil was added and the asphalt swollen.

As hereinbefore described, the present invention provides an improved asphalt mix for paving at ambient temperatures. The present asphalt mix is environmentally friendly, since the additive oil used in the present invention has a very low vapor pressure to be practically nonvolatile and, thus, the only volatile matter that may evaporate after application of the mix at a paving site will be virtually none, other than moisture. The asphalt mix of the present invention is suitable for forming asphalt concrete, which obtains sufficient stability instantly after compaction at ambient temperatures and, also, is suitable for long-term storage.

EXAMPLE

New aggregate was mixed with heated new asphalt, and was further mixed with recycled aggregate obtained from crushing recycled asphalt concrete to form an asphalt composition. To the asphalt composition, a prescribed amount of the oil in accordance with the present invention was added and further mixed rigorously. Optionally, calcium carbonate ($CaCO_3$) powder was thereafter added as a filler material. One ton each of asphalt mix samples was thus produced.

The Marshall stability test (ASTM D 1559-71) was conducted on each asphalt mix sample, and the results are shown in Table 1. One kilogram of each sample mix was rammed 50 times from one end, inverted, and again rammed 50 times from the other end in a specified cup, as prescribed in the Marshall stability test. The stability of the resulting test piece was then measured. According to the Marshall stability test, the test piece should be kept at 60° C. before measuring stability. However, since the asphalt mix formed in accordance with the present invention is suitable for application at ambient temperatures, the seven specimens shown in Table 1 were rammed at ambient temperatures, and their stability was then measured also at ambient temperatures. For comparison purposes, the stability test was also conducted on a prior art asphalt mix comprising only recycled aggregate obtained from crushing recycled asphalt concrete.

TABLE 1

| Sample No. | Recycled Aggregate (%) | New Aggregate (%) | CaCO$_3$ (%) | A1 (%) | New Asphalt A2 (%) | A3 (%) | Additive Oil (%) | Oil-to Asphalt Ratio | Stability |
|---|---|---|---|---|---|---|---|---|---|
| 1 | 93 | 0 | 5.8 | 5.5 | — | 5.1 | 1.2 | 0.24 | 621 |
| 2 | 65 | 28 | 4.3 | 5.5 | 1.5 (5.4) | 5.1 | 1.2 | 0.24 | 583 |
| 3 | 65 | 28 | 4.3 | 5.5 | 1.7 (6.0) | 5.3 | 1.0 | 0.19 | 536 |
| 4 | 46 | 46 | 4.2 | 5.1 | 2.5 (5.4) | 4.8 | 1.3 | 0.27 | 502 |
| 5 | 95 | 0 | 3.8 | 4.3 | — | 4.1 | 1.2 | 0.29 | 350 |
| 6 | 28 | 64 | 3.6 | 4.3 | 3.5 (5.5) | 4.7 | 1.2 | 0.26 | 456 |
| 7 | 67 | 30 | 0 | 5.5 | 1.8 (6.0) | 5.5 | 1.2 | 0.24 | 510 |

In Table 1, the amounts of recycled aggregate, new aggregate, calcium carbonate (CaCO$_3$), new asphalt, and additive oil are shown in percentage by weight of the produced asphalt mix. A1 indicates the weight percentage of the recycled asphalt retained on the recycled aggregate surfaces with respect to the weight of the recycled aggregate. In the new asphalt column, the number included in parentheses (A2) indicates the weight percentage of the new asphalt with respect to the weight of the new aggregate. A3 indicates the weight percentage of the total asphalt, including the new asphalt and the recycled asphalt retained on recycled aggregate surfaces, with respect to the total aggregate including both new and recycled aggregate. The mixing rate of oil to asphalt indicates a value calculated by dividing the weight of additive oil by the total weight of asphalt in the mix. The stability value in the table signifies a stability level in kg/cm$^2$ as measured in accordance with the Marshall stability test.

In Table 1, sample No. 1 was formed of high-quality recycled aggregate only, and its stability was above 600. This level of stability is sufficient to form a permanent pavement. Samples Nos. 2 and 3 were produced in accordance with the present invention by mixing 28% by weight of new aggregate with the recycled aggregate. Both samples demonstrated sufficient stability suitable for forming strong and stable pavements when applied at ambient temperatures.

Sample No. 4 includes the same amount of recycled aggregate and new aggregate. Its stability was lower as compared to the previous samples, but was still comparable with the stability of those prior art asphalt mixes suitable for application at ambient temperatures.

Samples Nos. 5 and 6 included recycled aggregate of relatively low quality, which included approximately as little as 4.3% by weight of asphalt within. With respect to sample No. 5, when only such poor-quality recycled aggregate was used, its stability was too low to guarantee a sufficiently strong paving surface.

However, referring to sample No. 6, when such poor-quality recycled aggregate was mixed with new aggregate in accordance with the present invention, the resulting asphalt mix exhibited sufficient stability suitable for use for forming a paving surface at ambient temperatures. In this example, new aggregate was mixed with heated asphalt to form an asphalt composition and, while the composition was still fluid, recycled aggregate was added and mixed and thereafter additive oil was mixed. With respect to sample No..6, it has been found that new asphalt having a penetration of between approximately 10 and 40 ($\frac{1}{10}$ mm at 20° C.) was preferable.

Sample No. 7 demonstrated a stability level of as high as 510 kg/cm$^2$ even without addition of calcium carbon.

The asphalt mixes produced in accordance with the present invention in Table 1 were used to pave an actual road that experiences daily, heavy traffic. These pavements demonstrated fracture strength substantially similar to the strength of asphalt pavements formed with heated asphalt mixes, which were applied while hot.

To test the storage characteristics of the asphalt mix produced in accordance with the present invention, 30 kg of each freshly produced asphalt mix sample (Nos. 1–7) were packed in a paper sack, and the sacks were stacked into ten-sack piles and sat at room temperature. After six months, the asphalt mixes packed in these sacks remained in their original granule form and, when compacted, demonstrated stability levels equivalent to the stability of pavements formed by compacting newly prepared mixes. For comparison purposes, other prior art asphalt mixes including volatile oil were tested for their storage characteristics. Most of these mixes became solidified within one to three months, and became unusable as a paving mix.

While the preferred embodiments of the present invention have been illustrated and described, it will be appreciated that various changes can be made therein without departing from the spirit and scope of the invention.

What is claimed is:

1. An asphalt mix suitable for forming a paving surface at an ambient temperature, comprising:
   new aggregate;
   new asphalt, the asphalt covering the surfaces of the new aggregate;
   recycled aggregate obtained from crushing recycled asphalt concrete, each aggregate grain being sized so as to retain asphalt at least partially on its surface; and
   additive oil having mutual solubility with asphalt and a low vapor pressure so as to be practically nonvolatile.

2. The asphalt mix of claim 1, wherein the new aggregate comprises between approximately 20% and 70% by weight of the total weight of the asphalt mix.

3. The asphalt mix of claim 2, wherein the new aggregate comprises between approximately 30% and 50% by weight of the total weight of the asphalt mix.

4. The asphalt mix of claim 1, wherein the additive oil is selected from the group consisting of petroleum hydrocarbons, animal/plant oils and fats, synthetic hydrocarbons, and synthetic esters.

5. The asphalt mix of claim 4, wherein the additive oil is heavy hydrocarbon oil having a flashpoint higher than approximately 200° C.

6. The asphalt mix of claim 1, wherein the additive oil has a flashpoint higher than approximately 200° C.

7. The asphalt mix of claim 1, wherein the additive oil has a kinematic viscosity ranging between approximately 20 and 200 (cSt. at 40° C.).

8. The asphalt mix of claim 7, wherein the additive oil has a kinematic viscosity ranging between approximately 40 and 120 (cSt. at 40° C.).

9. The asphalt mix of claim 1, wherein the ratio of the additive oil to the total asphalt amount on both new and recycled aggregate surfaces is between approximately 0.15 and 0.5 by weight.

10. The asphalt mix of 9, wherein the ratio is between approximately 0.2 and 0.35.

11. The asphalt mix of claim 1, wherein the new aggregate comprises sand.

12. The asphalt mix of claim 11, wherein the new aggregate further comprises crushed stones.

13. The asphalt mix of claim 1, wherein the new aggregate comprises crushed stones.

14. The asphalt mix of claim 1, wherein the penetration of the new asphalt is between approximately 20 and 120 (1/10 mm at 25° C.).

15. The asphalt mix of claim 1, wherein the new asphalt and the asphalt retained on the surfaces of the recycled aggregate comprise approximately 4% to 6% by weight of the total weight of the asphalt mix.

16. The asphalt mix of claim 15, wherein the new asphalt comprises approximately 4.5% to 6.5% by weight of the total weight of the new aggregate.

17. The asphalt mix of claim 1, further comprising calcium carbonate powder of between approximately 3% and 10% by weight of the total weight of the asphalt mix.

18. The asphalt mix of claim 17, wherein the calcium carbonate powder comprises between approximately 5% and 7% by weight of the total weight of the asphalt mix.

19. A process for making an asphalt mix suitable for forming a pavement surface at an ambient temperature, comprising:
- providing heated new aggregate;
- providing heated new asphalt;
- mixing the new aggregate and the new asphalt so that the surfaces of the new aggregate are covered with the asphalt;
- providing recycled aggregate obtained from crushing recycled asphalt concrete, each aggregate grain being sized so as to retain asphalt at least partially on its surface;
- mixing the recycled aggregate with the heated new aggregate covered with the heated new asphalt to form an asphalt composition and lowering the asphalt composition temperature to, at the maximum, approximately 100° C.;
- mixing a prescribed amount of additive oil to the asphalt composition, the oil having mutual solubility with asphalt and a low vapor pressure so as to be practically nonvolatile; and
- swelling the asphalt on the surfaces of new and recycled aggregate with the oil.

20. The process of claim 19, wherein the new aggregate and asphalt are heated to between approximately 150° C. and 160° C.

21. The process of claim 19, wherein the new aggregate comprises between approximately 20%/ and 70% by weight of the total weight of the asphalt mix.

22. The process of claim 21, wherein the new aggregate comprises between approximately 30% and 50% by weight of the total weight of the asphalt mix.

23. The process of claim 19, wherein the additive oil is selected from the group consisting of petroleum hydrocarbons, animal/plant oils and fats, synthetic hydrocarbons, and synthetic esters.

24. The process of claim 23, wherein the additive oil is heavy hydrocarbon oil having a flashpoint higher than approximately 200° C.

25. The process of claim 19, wherein the additive oil has a flashpoint higher than approximately 200° C.

26. The process of claim 19, wherein the additive oil has a kinematic viscosity ranging between approximately 20 and 200 (cSt. at 40° C.).

27. The process of claim 26, wherein the additive oil has a kinematic viscosity ranging between approximately 40 and 120 (cSt. at 40° C.).

28. The process of claim 19, wherein the ratio of the additive oil to the total asphalt amount on both new and recycled aggregate surfaces is between approximately 0.15 and 0.5 by weight.

29. The process of claim 28, wherein the ratio is between approximately 0.2 and 0.35.

30. The process of claim 19, wherein the new aggregate comprises sand.

31. The process of claim 30, wherein the new aggregate further comprises crushed stones.

32. The process of claim 19, wherein the new aggregate comprises crushed stones.

33. The process of claim 19, wherein the penetration of the new asphalt is between approximately 20 and 120 (1/10 mm at 25° C.).

34. The process of claim 19, wherein the new asphalt and the asphalt retained on the surfaces of the recycled aggregate comprise approximately 4% to 6% by weight of the total weight of the asphalt mix.

35. The process of claim 34, wherein the new asphalt comprises approximately 4.5% to 6.5% by weight of the total weight of the new aggregate.

36. The process of claim 19, further comprising adding calcium carbonate to the asphalt composition after the asphalt composition is mixed with the additive oil and the asphalt swollen.

37. The process of claim 36, wherein the calcium carbonate powder comprises approximately 3% and 10% by weight of the total weight of the asphalt mix.

38. The process of claim 37, wherein the calcium carbonate power comprises approximately 5% and 7% by weight of the asphalt mix.

* * * * *

UNITED STATES PATENT AND TRADEMARK OFFICE
CERTIFICATE OF CORRECTION

PATENT NO.   : 6,214,103 B1
DATED        : April 10, 2001
INVENTOR(S)  : T. Kitagawa It is certified that error appears in the above-identified patent and that said Letters Patent is hereby corrected as shown below:

Column 9,
Line 13, "asphalt mix of 9," should read -- asphalt mix of Claim 9, --

Column 10,
Line 5, "approximately 20%/ and 70%" should read -- approximately 20% and 70% --
Line 59, "carbonate power" should read -- carbonate powder --

Signed and Sealed this

Twenty-ninth Day of January, 2002

Attest:

JAMES E. ROGAN
*Attesting Officer*  *Director of the United States Patent and Trademark Office*